US006739457B2

(12) United States Patent
Humphries, II et al.

(10) Patent No.: US 6,739,457 B2
(45) Date of Patent: May 25, 2004

(54) DEFLECTOR FOR CENTRIFUGAL PELLET DRYER SCREEN

(75) Inventors: Toney Reid Humphries, II, Roanoke, VA (US); William Douglas Woodson, Eagle Rock, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 0 days.

(21) Appl. No.: 09/931,372

(22) Filed: Aug. 17, 2001

(65) Prior Publication Data

US 2003/0033725 A1 Feb. 20, 2003

(51) Int. Cl.[7] .......................... B01D 21/26; F26B 17/30

(52) U.S. Cl. .................... 210/374; 210/377; 210/512.3; 34/58; 34/59

(58) Field of Search .............................. 210/360.1, 374, 210/512.3, 377; 34/58, 59

(56) References Cited

U.S. PATENT DOCUMENTS

| | | | |
|---|---|---|---|
| 1,039,449 A | 9/1912 | Scott | |
| 1,735,479 A | 11/1929 | Sturtevant | |
| 2,745,193 A | 5/1956 | Ladd et al. | 34/102 |
| 3,330,050 A | 7/1967 | Ausherman | 34/174 |
| 3,458,045 A | 7/1969 | Dudley | 210/95 |
| 4,565,015 A | 1/1986 | Hundley, III | 34/182 |
| 4,810,270 A | 3/1989 | Terry et al. | 55/294 |
| 4,896,435 A | 1/1990 | Spangler, Jr. | 34/58 |
| 5,265,347 A | 11/1993 | Woodson et al. | 34/58 |
| 6,138,375 A | 10/2000 | Humphries, II et al. | 34/59 |

*Primary Examiner*—David A. Reifsnyder
(74) *Attorney, Agent, or Firm*—Jacobson Holman PLLC

(57) ABSTRACT

A deflector mounted on the internal surface of a cylindrical screen in a centrifugal pellet dryer. The deflector is one or more vertical strips mounted in spaced relation on the interior surface of the screen by bolting to mating mounting strips on the outside of the screen. The deflector strips deflect the pellets moving along the interior surface of the screen. The edge of the deflector strip facing the direction of movement of the circulating pellets is inclined to deflect the pellets back toward the rotor. In another form, the deflector strip has angled flanges with one flange clamped between outwardly extending vertical side edge flanges on the cylindrical screen. The other flange extends at an oblique angle to deflect the circulating pellets back toward the rotor.

20 Claims, 4 Drawing Sheets

DEFLECTOR FOR CENTRIFUGAL PELLET DRYER SCREEN

BACKGROUND OF THE INVENTION

1. Field of the Invention

The present invention generally relates to a centrifugal pellet dryer of the type which utilizes a bladed lift rotor conveying moisture laden plastic pellets or other solid particles upwardly within a cylindrical screen with the centrifugal force imparted to the particles by rotation of the lift rotor causing the particles to engage the interior surface of the screen, and moisture on the particles to be discharged through the screen in a manner well known in the art. More specifically, the present invention relates to a deflector associated with the internal surface of the cylindrical screen.

2. Description of the Prior Art

Centrifugal pellet dryers are well known in the art for separating water or moisture from plastic pellets and other solid particles, such as a slurry of water and plastic pellets produced by underwater pelletizers. Centrifugal pellet dryers of the prior art include a vertically disposed outer housing, a cylindrical screen oriented in the housing and a driven bladed rotor positioned centrally in the screen. The rotor moves water laden pellets or other solid particles upwardly within the screen with centrifugal forces imparted to the particles by the rotor causing the particles to move radially outwardly into engagement with the screen for discharge of water through the screen. The dried particles are discharged from the upper end of the screen and housing, and water is discharged from the lower end of the housing. Centrifugal pellet dryers of this type are disclosed in U.S. Pat. Nos. 3,458,045; 4,565,015; 4,896,435; 5,265,347 and 6,138,375, commonly owned by the Assignee of this application. In the operation of such dryers, the pellets or other particles being moved vertically and radially by the bladed rotor engage the cylindrical screen with substantial velocity and usually bounce off the screen back toward the rotor for imparting further vertical and centrifugal forces to the particles as they are moved upwardly inside the screen.

However, with the advent of newer plastic materials which form softer pellets, and the making of very small pellets, or so-called micropellets, on underwater pelletizers, difficulties have been encountered in drying such pellets in known centrifugal dryers. Further, known centrifugal dryers have encountered difficulty in drying ground flake plastic materials which are formed from recycled soda bottles, milk containers and the like, as well as certain other plastic particles such as ground battery casings. More specifically, softer and smaller pellets and plastic flakes, as well as certain other plastic and similar particles, tend to collect and circulate in the clearance band between the outer edges of the rotor blades and the inner surface of the screen rather than bouncing around in the manner of harder and larger pellets or particles. This circular flow of the softer and smaller pellets and plastic flakes and particles along the inner surface of the screen is sometimes referred to as "banding" and reduces product flow through the rotor area of the dryer and increases power requirements for maintaining rotational speed of the rotor. Further, it has been found that banding also reduces the efficiency of moisture separation from the solid particles, can cause high amperage surge requirements within the dryer, and reduces overall efficiency of the centrifugal dryer.

Accordingly, there is a need to improve existing centrifugal dryers in order to overcome this problem of banding when separating solid particles and water slurries, especially with soft and/or small pellets and certain plastic flakes and particles.

SUMMARY OF THE INVENTION

The present invention is used with a centrifugal pellet dryer of the vertical type having a vertical cylindrical screen associated with a vertical housing and a bladed rotor oriented in the cylindrical screen for conveying a slurry of water and polymer resin particles upwardly in the screen. Centrifugal forces imparted to the solid particles by the rotor cause the particles to impact the screen to discharge water outwardly through the screen, while the dried particles are discharged from an upper end of the screen and water is discharged from the lower end of the housing in a manner well known in this art. Cylindrical screens for centrifugal pellet dryers are typically made from several screen sections which are vertically aligned and interconnected together.

In order to overcome the problems of such centrifugal dryers when separating water from soft and/or small pellets or plastic flakes, and certain other plastic particles, the inside of the cylindrical screen is provided with a deflector in the form of one or more vertical elongated strips provided on the inside surface of the screen. The edge or side of the strip which faces the direction of rotation of the blades on the rotor, and thus the solid particles being circulated by those blades, is preferably inclined from a leading edge at the screen to a trailing edge so that particles moving in a rotational direction or circulating along the surface of the screen are deflected back toward the blades on the rotor. The vertical strip disrupts the circular flow of the particles, particularly softer and smaller pellets, plastic flakes, and certain other plastic particles, and directs the solid particles radially inward toward the rotor blades. This disruption of the circular flow improves particle flow through the rotor area of the dryer by aiding in the rotor's vertical lift of the particles and by eliminating particles banding.

Further, the deflector of the present invention reduces the power required for rotating the rotor at a desired speed and eliminates shutdown of the dryer due to high amperage surges required to drive the rotor when the plastic particles are banding along the inner surface of the screen, which banding increases the load on the bladed rotor. In addition, the preferred deflector structure of the present invention also assists in stiffening the cylindrical configuration of the screen.

Preferably in accordance with the present invention, all of the cylindrical screen sections of the centrifugal dryer, except for the lowermost screen section, are provided with deflector strips mounted on or extending into the interior surface of each screen section. The deflector strips are preferably aligned vertically if mounted in more than one screen section. Further, one to four deflector strips are preferred for each section depending upon the size of the screen, with the deflector strips circumferentially spaced around the interior surface of the screen section when two or more are utilized. Small diameter cylindrical screens may require only a single deflector strip, whereas larger diameter cylindrical screens may require three or four, or more, circumferentially spaced deflector strips.

The deflector strips are disposed in the clearance band or annular space between the outer edges of the rotor blades and the interior surface of the screen. Usually, the outer edges of the rotor blades are spaced from the screen a distance of about 3/8 inch to about 1/2 inch, and the deflector strips therefore have a thickness, or project, less than this clearance space between the screen and blade edges. A preferred thickness for the strips has been found to be about 0.10 inches to about 0.25 inches, and most preferably about 0.14 inches. A preferred width for the deflector strips has been found to be between about 0.50 inches and about 0.80 inches, but more in one embodiment. In the preferred embodiment, the preferred width is about 0.62 inches. The edge of each strip facing the direction of rotation of the bladed rotor is preferably beveled or inclined from a leading edge at the screen surface to a trailing edge at the inner surface of the strip to form an inclined surface. In one form, the inclined surface is preferably angled at about 45°, although other angles could be adopted. In another form, the inclined surface is preferably angled at about 70°. While not preferred, the deflector strips of the present invention could present a leading edge without any bevel or incline.

The deflection of the solid particles toward the rotor is especially significant when the particles being dried have a tendency to collect on and move along the inner surface of the screen rather than bouncing back toward the rotor as occurs when drying harder or large pellets and particles. The deflector strip interrupts the circular flow of the particles around the clearance band inside the screen, and the inclined surface deflects the particles back toward the rotor. The deflector strips therefore eliminate the tendency of the particles to flow in a band around the inner circumference of the screen, and cause the particles to move radially back toward the rotor blades thereby increasing product flow and efficiency of moisture separation and reducing power requirements and high amperage surge requirements which sometimes can result in temporary shutdown of the dryer.

The deflector strips can be attached to the cylindrical screen or sections by any convenient attaching mechanism. One preferred mechanism includes a mating mounting strip having approximately the same strip size and shape, which mounts to the exterior surface of the cylindrical screen or section. The deflector strip on the inside of the cylindrical screen and the mounting strip on the outside of the cylindrical screen can then be bolted together through the wall of the cylindrical screen. The bolt head is preferably positioned on the deflector strip side, and counter sunk to present a smooth surface toward the rotor. The mating interconnected deflector strips and mounting strips also serve to stiffen the cylindrical screen or screen sections. While such a mechanism is preferred for mounting the deflector strips vertically within the cylindrical screens, other mechanical and other type mechanisms will readily occur to those skilled in the art.

In another form of deflector strip in accordance with the present invention, the elongated deflector strip is in the general form of an angle iron with the angle between the two flanges being approximately 110°, rather than the standard 90°, or perpendicular, relationship. In this form, one of the flanges of the angle iron is clamped between the outwardly extending vertical side edge flanges which are bolted together in forming the cylindrical screen or screen section. In addition to being clamped, the flange is also preferably welded to one of the side edge flanges. The other flange of the deflector strip extends into the clearance band or annular space between the outer edges of the rotor blades and the interior surface of the screen to present an oblique inclined surface to the advancing particles circulating in the annular space. The angle Of the inclined surface is on the order of preferably 160° from a plane tangent to the cylindrical screen or section inner surface.

It is therefore an object of the present invention to provide a deflector on the interior of a cylindrical screen of a centrifugal pellet dryer in the form of one or more vertical elongated deflector strips which deflect the solid particles moving along the interior surface of the screen back toward the rotor conveying the moisture laden particles upwardly in the dryer screen in order to increase particle flow and more efficiently separate moisture from the particles.

Another object of the present invention is to provide one or more vertical deflector strips circumferentially spaced around the interior surface of the screen with the number of deflector strips being varied depending upon the diameter of the screen, with there preferably being one to four deflector strips.

A further object of the present invention is to position one or more vertical deflector strips on the interior surface of a cylindrical screen in a centrifugal pellet dryer such that the edge or side of the strip facing the direction of rotation of the rotor is inclined with the inclined surface having a leading edge adjacent the screen in advance of the trailing edge adjacent the path of the rotor blades to form a surface which deflects the pellets or other solid particles toward the rotor as the particles move along the interior surface of the screen.

Still another object of the present invention is to position one or more vertical deflector strips on the interior surface of the cylindrical screen in a cylindrical pellet dryer in accordance with the preceding objects in which the inclined leading surface on each deflector strip interrupts the tendency of certain type plastic pellets and other particles to collect and circulate in the clearance band along the inner surface of the screen, thereby more efficiently enabling separation of moisture from the particles by causing them to move back toward the rotor for engagement with the rotor blades.

Still a further object of the present invention is to mount one or more deflector strips on the interior surface of the cylindrical screen in a cylindrical pellet dryer by means of a mounting strip having approximately the same strip size and shape which mounts to the exterior surface of the cylindrical screen opposite the deflector strip which then can be affixed together through the wall of the cylindrical screen by an appropriate bolt or other fastener connection.

Yet another object of the present invention is to provide a deflector strip in the general form of an angle iron which can be clamped between the outwardly extending vertical side edge flanges, and preferably welded to one flange, which are bolted together to form the cylindrical'screen so as to position the other flange on the interior surface of the cylindrical screen to present an oblique inclined angle to the solid particles which collect and circulate in the clearance band along the inner surface of the screen.

Yet a further object of this invention to be specifically enumerated herein is to provide a deflector for the cylindrical screen of centrifugal pellet dryers in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
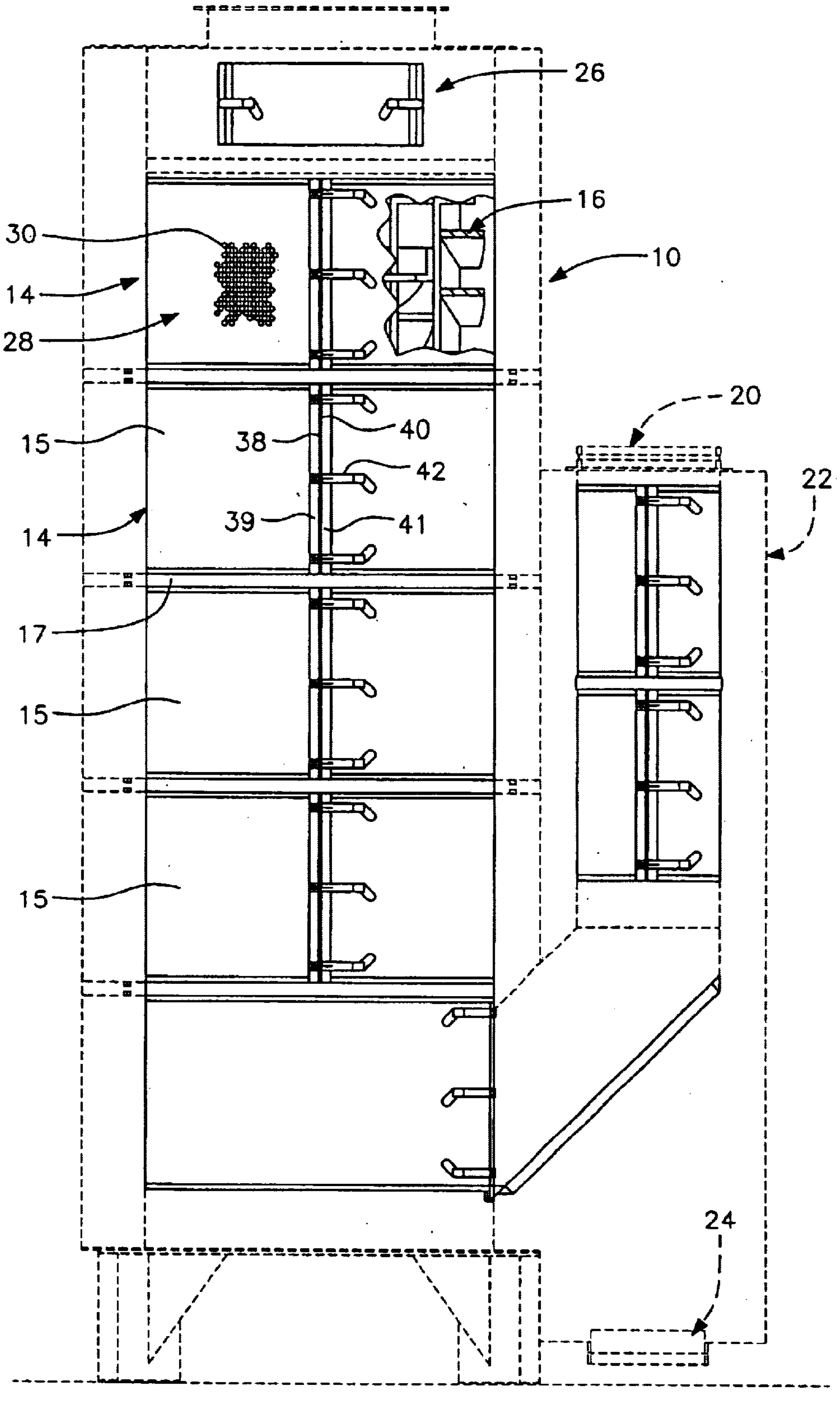
FIG. 1 (PRIOR ART)
FIG. 1 is a schematic elevational view of a centrifugal pellet dryer illustrating a sectional cylindrical screen and bladed left rotor assembly associated with a dryer housing.

Although only certain embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing the various embodiments, specific terminology will be resorted to for the sake of clarity. It is to be understood that each specific term includes all technical equivalents which operate in a similar manner to accomplish a similar purpose.

Referring to FIG. 1, a conventional centrifugal pellet dryer of the vertical type is generally designated by reference numeral 10 and includes a dryer housing 12 having a sectional screen 14 mounted vertically therein. The sectional screen 14 is shown having four approximately equal screen sections 15 aligned vertically and interconnected at 17. The screen 14 encloses and is concentric to a bladed rotor, generally designated by reference numeral 16, which includes inclined blades 18. The blades 18 include outer edges adjacent the interior surface of the screen sections 15 supported in a manner well known in the art.

The dryer 10 includes an inlet 20 for receiving a slurry of water and pellets from an underwater pelletizer, or other type water slurry containing solid particles, such as plastic flakes, from recycled soda bottles, milk containers, etc., or other solid plastic particles such as ground battery casings. The inlet 20 discharges the slurry into a dewaterer 22 for initial separation of water from the pellets or other solid particles for discharge of water through an outlet 24 and discharge of moisture laden particles into the bottom section of the sectional screen 14. The solid particles move upwardly through the screen sections 15 by the rotor 16 to an outlet 26 at the upper end of upper screen section 15. The rotor imparts lift and centrifugal forces to the particles to impact the particles against the screen for separating water from the particles with the separated water passing through the screen into the housing and out through outlet 24 in a manner well known in the art as exemplified by the previously mentioned prior patents.

Figures 2, 3, 4:
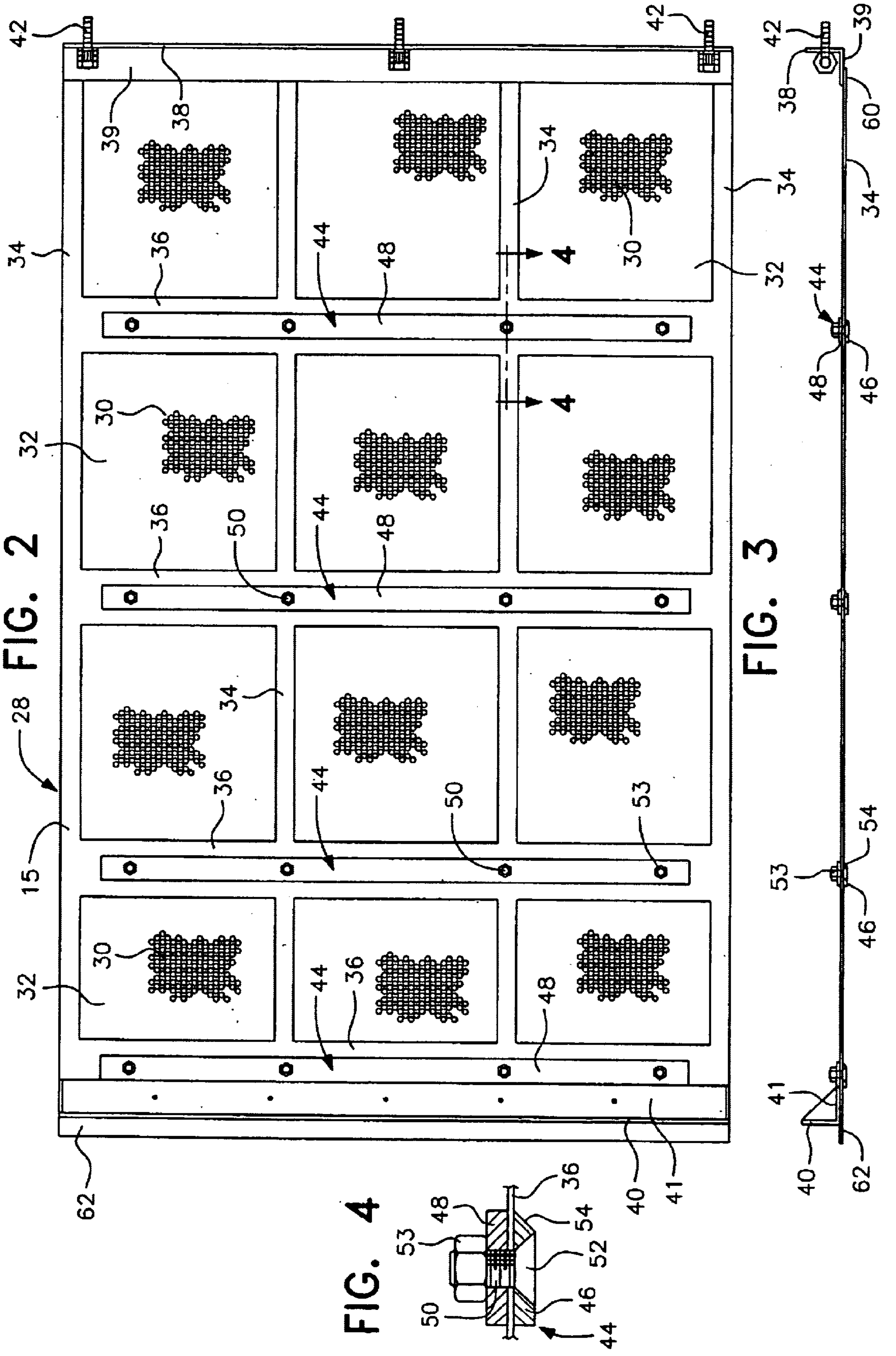
FIG. 2 is a plan view of one of the screen sections shown in FIG. 1, illustrating the outside surface of the screen in a flat condition prior to it being formed into a cylindrical screen section with four deflector strips mounted on the inside surface and showing the four mounting strips on the outside surface, in accordance with a preferred embodiment of the present invention.
FIG. 3 is an edge view of the screen section illustrated in FIG. 2.
FIG. 4 is a sectional view, on an enlarged scale, taken along section line 4—4 on FIG. 2, illustrating the structure of one of the deflector strips and its mating mounting strip including their association with the screen and the fastening structure for securing the strips to the screen.

FIG. 2 illustrates the outside of one screen section 15 which includes a stainless steel plate 28 of 20 gauge thickness with 0.075 inch diameter holes 30 punched therethrough from the surface facing inwardly of screen section 15. The holes 30 have staggered centers and are oriented in discrete areas 32 thereby defining intersecting solid sections 34 and 36. The plate 28 which is formed when in a flat condition is retained in a cylindrical configuration by connecting outwardly extending vertical side edge flanges 38 and 40 on the respective vertical solid edge sections 60 and 62.

As illustrated in FIG. 3, the side edge flange 38 includes an attaching flange 39 overlying and secured to edge section 60, such as by spot welding on 3 inch centers, with the outer edge of edge section 60 spaced inwardly about ½ inch from the juncture between flanges 38 and 39. The other side edge flange 40 includes an attaching flange 41, preferably spot welded to edge section 62. As shown, the edge section 62 is wider than the edge section 60. Also, the juncture between flanges 40 and 41 is spaced inwardly about ½ inch from the outer edge of edge section 62. This spacing allows the free side edge of edge section 62 to underlie the portion of attaching flange 39 outwardly of side edge section 60 when the screen section 15 is formed into a cylindrical configuration and flanges 38 and 40 are joined. A preassembled stud 42 on the flange 38 includes slots to enable limited movement of the stud 42 for connection with the flange 40 by extending through apertures therein and receiving anchoring nuts. The joined edges of the side edge sections 60 and 62 provide a continuous interior surface to the screen section 15 when formed into a cylindrical configuration.

The deflector strips of the present invention are preferably continuous elongated metal strips, generally designated by reference numeral 44. The strips 44 are preferably made from stainless steel or other material similar to the screen plate 28. As shown in FIGS. 2 sand 3, the strips 44 are mounted on the intermediate solid sections 36 and side edge section 62 against the inner surface of the screen plate 28. Associated with each deflector strip 44 is a continuous vertical mounting strip 48 positioned against the outer surface of the screen plate 28. The deflector strip 44 and mounting strip 48 have approximately the same size and are positioned facing each other with the screen plate 28 sandwiched therebetween. A bolt 50 having a countersunk tapered head 52 extends from the inner surface 46 of the deflector strip 44 beyond the outer surface of the outer strip 48. A retaining lock nut 53 retains the strips 44 and 48 in assembled relation on the screen solid sections 36 and 62.

When assembling the deflector strips 44 and mounting strips 48 on the screen plate 28, the mounting strip 48 is first preferably spot welded onto the outside surface of the screen plate 28 with the holes for receiving bolt 50 in proper alignment. The deflector strips 44 are then positioned in alignment on the inside surface of the screen plate 28, the bolts 50 inserted through the openings, and the retaining lock nuts 53 threaded thereon.

The edge surface of the deflector strips 44 is preferably inclined at 54. The inclined surface 54 includes a leading edge along the inner surface of the screen plate 28 and a trailing edge along the strip inner surface 46 adjacent the rotor 16. The surface 54 is opposed to the direction of rotation of the rotor 16 thereby defining a wedge shape or cam surface facing the direction of rotation and causing pellets or other solid particles moving along the inner surface of the screen sections 15 to be deflected inwardly toward the rotor 16.

The inclined surfaces 54 on the vertical deflector strips 44 will deflect pellets and other solid particles that tend to collect and move along the inner surface of the screen sections 15 back toward the rotor for engagement by the rotor blades and prevent the particles from circulating around the inner surface of the screen and beyond the reach of the rotor blades. The rotor then moves the particles outwardly again to impact against the screen to more effectively separate moisture from the particles. The inclined edge surfaces 54 of the deflector strips 44 is especially effective in preventing softer and/or smaller pellets and plastic flakes and particles from collecting and moving in a circular path in the clearance band along the inner surface of the screen sections. The elimination of banding of these particles as they move in the clearance band of the screen sections increases particles flow, more effectively removes moisture from the pellets, reduces power requirements and eliminates high amperage surge requirements.

Figure 5:
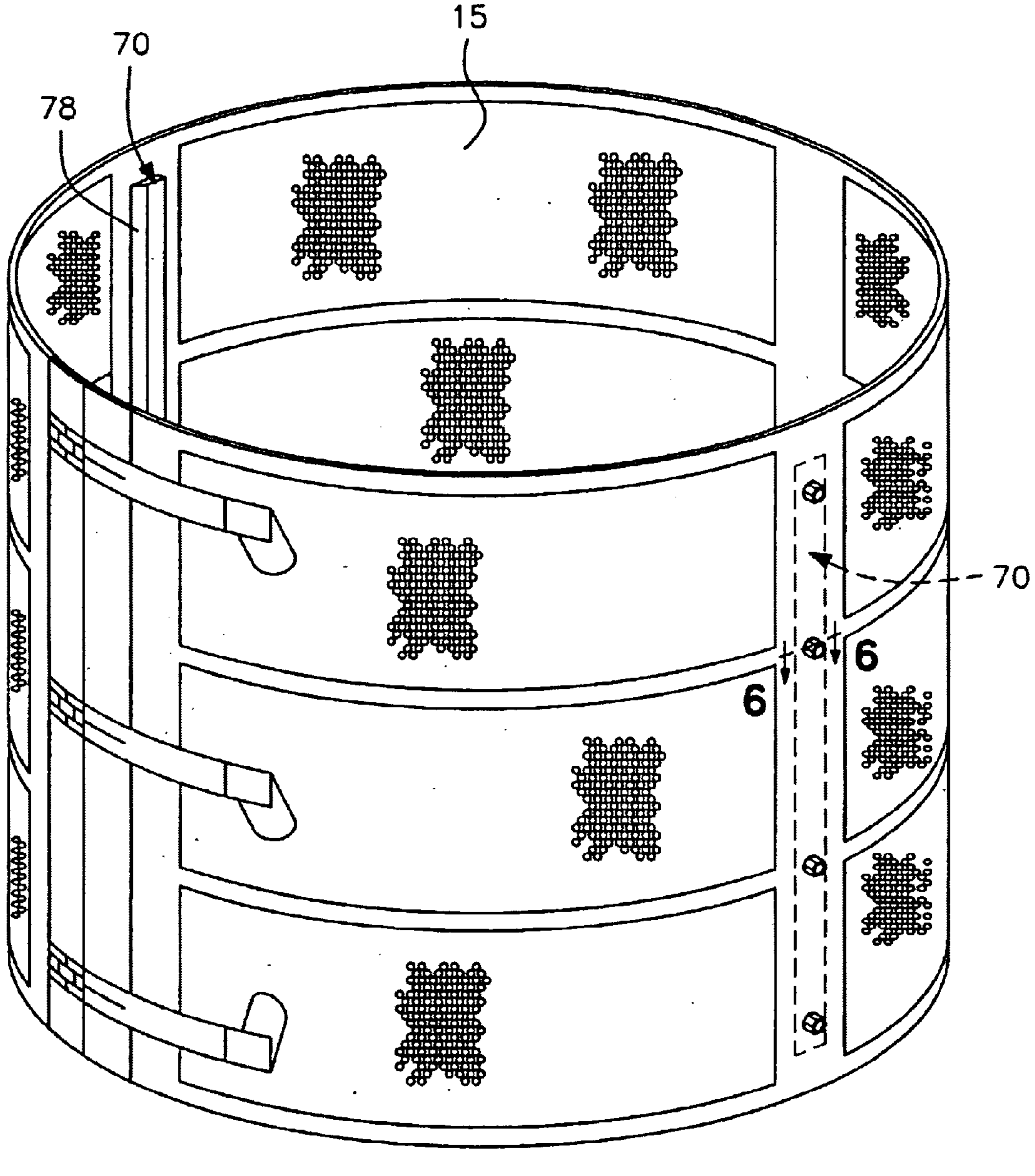
FIG. 5 is a perspective view of another cylindrical screen section for a centrifugal pellet dryer having two deflector strips in accordance with the present invention mounted on the interior surface, but using a different mounting mechanism.
Figure 6:
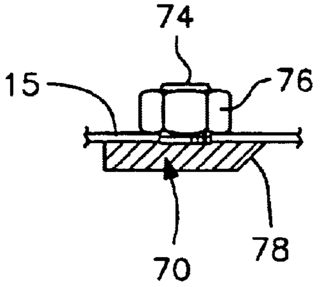
FIG. 6 is a sectional view, on an enlarged scale, taken along section line 6—6 on FIG. 5.

Turning now to FIGS. 5 and 6, another embodiment of the deflector strip of the present invention is disclosed and generally designated by reference numeral 70. In this embodiment, two deflector strips 70 are mounted on the inside surface of the cylindrical screen section 15, and a different mounting mechanism is disclosed. In particular, machine threaded bolts 74 are welded to the inside surface of the deflector strips 70 at appropriately spaced locations. The threaded bolts 74 protrude through matching holes in the cylindrical screen section 15 on which appropriate locking nuts 76 can be installed to affix the deflector strip 70 in place on the screen section. The beveled or inclined leading edge is shown at 78.

The number and spatial relation of the deflector strips 44 and 70 may vary depending on the diameter of the screen sections 15. Usually one to four deflector strips 44 or 70 are adequate in most screen sections up to about 64 inches in diameter. Also in dryers having multiple screen sections 15, the lowest screen section 15, where the water and solid particle slurry enter the screen, may be constructed without deflector strips. In the upper sections having the deflector strips, the strips are preferably aligned vertically, although such alignment is not always necessary.

The deflector strips 44 and 70 of the present invention have a thickness preferably about 0.10 inches to about 0.25 inches, and most preferably about 0.14 inches, and a width of about 0.50 inches to about 0.80 inches, and most preferably about 0.62 inches. The beveled or inclined leading edge 54 is preferably angled at about 45°, although any angle which deflects the pellets or other solid particles banding around the inner surface of the screen back towards the rotor blades could be used in accordance with the present invention. In some applications it may be possible to eliminate the bevel or inclined leading edge, although this configuration is not preferred.

Figure 7:
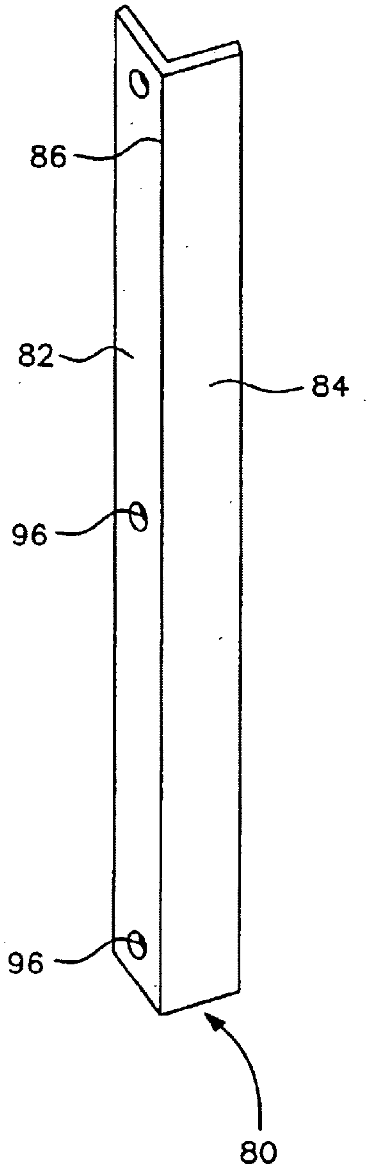
FIG. 7 is a perspective view of another type deflector strip in accordance with the present invention for assembly between the outwardly extending vertical side edge flanges of the cylindrical screen.
Figure 8:
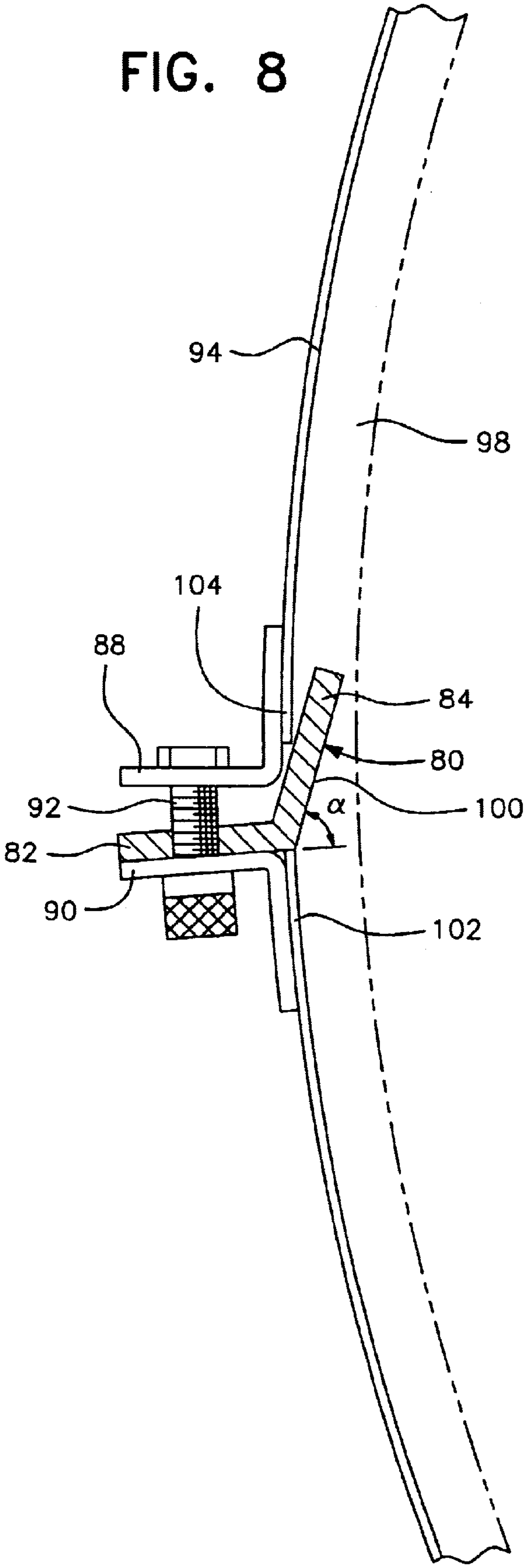
FIG. 8 is a partial cross-sectional view illustrating the deflector strip of FIG. 7 mounted in position within the outwardly extending vertical side edge flanges.

Another embodiment of the elongated deflector strip of the present invention is disclosed in FIGS. 7 and 8 and generally designated by reference numeral 80. As shown, the deflector strip 80 is generally in the form of an elongated section of angle iron with flanges 82 and 84 extending from interconnection 86. The flanges 84 and 86 are interconnected at an obtuse angle, rather than the normal perpendicular relationship of angle iron. The flange 82 is clamped between the outwardly extending vertical side edge flanges 88 and 90 which are attached together by bolts 92 when forming the cylindrical screen or screen section 94. Before the screen or screen section 94 is formed and side edge flanges 88 and 90 attached together, flange 82 of angle iron 80 is preferably welded to side edge flange 90. The flange 82 of deflector strip 80 has appropriately spaced holes 96 aligned with the holes in flanges 88 and 90 to receive the bolts 92 therethrough.

When welded and clamped in position, as seen generally in FIG. 8 (a slight spacing is shown for illustration purposes), the elongated deflector strip flange 84 extends into the clearance band or annular space, indicated by reference numeral 98, between the outer edges of the rotor blades and the interior surface of the screen or screen section 94. The flange 84 has an inclined leading edge or surface 100 which deflects the pellets or other solid particles banding around the inner surface of the screen or screen section in annular space 98, back towards the rotor blades. The angle $\alpha$ of the inclined surface 100 is preferably about 70°, although smaller and larger angles could be used, as much as + or − 10° or more. It will be noted that the side edge sections 102 and 104 are adjusted to accommodate the deflector strip 80 extending therethrough (compare FIG. 8 to FIG. 3).

In its preferred form the deflector strip 80 is thicker and wider, and therefore more sturdy, than the deflector strips 44 and 70. The deflector strip 80 has special application in centrifugal pellet dryers where the particles being dried are large and/or heavy, thus contributing to potentially heavier wear and strip breakage, for example when drying slurries containing ground battery casing particles. In this configuration, the deflector strip 80 will not dislodge completely from the interior of the cylindrical screen For screen section 94, rather only parts of flange 84 might tear away under particularly heavy particle flow around annular space 98. The elongated deflector strip 84 preferably has a thickness of about 0.19 inches, and each of the flanges 82 and 84 are preferably about 1.00 inch in width. While this embodiment of the present invention is not preferred, the deflector strip 80 has beneficial characteristics in certain centrifugal pellet dryer applications, as mentioned above.

The length of the deflector strips 44, 70 and 80 depends upon the height of the cylindrical screen section 15, or cylindrical screen if one piece, and are preferably of a length so as to leave a space of about one inch from the top and bottom ends of the deflector strip to the upper and lower edges of the screen section (or screen), although this spacing can be varied as desired.

While the deflector strips 44 and 70, and mounting strips 48, are preferably continuous metal strips, they could be discontinuous and of smaller length. Continuous metal strips are preferred because they tend to stiffen the cylindrical screen or screen section, thus perhaps allowing for a thinner screen plate 28. If the strips 44 and 48 are discontinuous, they might preferably be mounted in a vertical staggered array from adjacent the bottom edge of the screen plate 28 to adjacent the top edge of the screen plate 28. In such a manner, banding solid particles which miss one metal strip in a circumferential pass around the clearance band would encounter another metal strip in its path.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A deflector for the interior surface of a generally cylindrical vertically disposed screen in a vertical centrifugal pellet dryer, said deflector comprising at least one vertical deflecting strip supported from said screen and positioned along the interior surface of the screen in generally parallel relation to the rotational axis of a driven bladed rotor operating within the screen for lifting and moving water laden pellets outwardly in a circular path to impact with the screen to separate water from the pellets for discharge of the water through the screen, said vertical strip including an inclined surface forming a leading edge oriented in opposed relation to circular movement of the pellets along the interior surface of the screen to deflect the pellets toward the rotor.

2. The deflector as defined in claim 1, wherein said inclined surface forming the leading edge of the strip includes an outer edge engaging the screen in leading relation to an inner edge adjacent the rotor to define an inclined surface facing pellets moving in a circular path for deflection of the pellets toward the rotor.

3. The deflector as defined in claim 2, wherein said strip is mounted on said screen by a bolt having a countersunk head flush with an inner surface of said strip to facilitate movement of the pellets between the rotor and strip.

4. The deflector as defined in claim 1, and further including at least one vertical mounting strip positioned on the outer surface of said screen and aligned with said at least one vertical deflecting strip and fasteners extending through said screen and strips to attach said strips to said screen.

5. The deflector as defined in claim 1, wherein said at least one vertical deflecting strip is mounted on the interior surface of the screen.

6. The deflector as defined in claim 1, together with a plurality of additional vertical deflecting strips supported from said screen and positioned along the interior surface of said screen in circumferentially spaced relation.

7. The deflector as defined in claim 1, wherein said at least one vertical deflecting strip includes an elongated vertical flange between radially outwardly extending vertical side edge flanges on said screen which are bolted together to form said cylindrical screen.

8. The deflector as defined in claim 1, wherein said vertical strip has a lower end oriented above the lower edge of said screen and an upper end terminating adjacent an upper end of said screen.

9. The deflector as defined in claim 1, wherein said vertical strip is positioned adjacent to but outwardly of the path of movement of blades on the rotor.

10. The deflector as defined in claim 1, wherein said deflector enables blades on the rotor to increase product flow through the dryer and more effectively remove water from the pellets.

11. The deflector as defined in claim 1, wherein said vertical strip is substantially continuous from adjacent a lower edge of said screen to adjacent an upper edge of said screen.

12. In combination with a dryer having a cylindrical screen and a driven bladed rotor disposed within said screen for moving moisture laden particles longitudinally of the screen and radially outwardly for impact with said screen for separating moisture from the particles and discharge of the moisture through the screen, said cylindrical screen having vertical aligned end edges, said combination further including at least one generally vertical extending deflector strip mounted on an inner surface of said screen spaced from said vertically aligned end edges for interrupting a flow of particles moving along an inner surface of the screen.

13. The combination as defined in claim 12, wherein said deflector includes an inclined surface in opposed relation to the flow of the particles for directing the particles back toward the rotor for more effective movement of the particles and more effective separation of moisture from the particles.

14. The combination as defined in claim 12, wherein said deflector includes a plurality of longitudinally extending strips mounted on the interior surface of the screen, said strips being mounted in circumferentially spaced relation on the screen with each strip including an inclined surface facing the direction of rotation of the rotor for deflecting particles back toward the rotor to increase particle flow through the dryer and enhance separation of moisture by repeated application of centrifugal force to the particles during rotation of the rotor.

15. The combination as defined in claim 12, wherein said dryer, screen, bladed rotor and deflector strips are vertically oriented with the bladed rotor lifting the particles and imparting centrifugal forces thereto for impacting the particles against the screen for separation of moisture from the particles and discharge of moisture through the screen.

16. The combination as defined in claim 12, wherein said combination includes a plurality of generally vertically extending deflector strips mounted on an inner surface of said screen.

17. The combination as defined in claim 16, wherein said deflector strips are continuous extending from adjacent the bottom edge of said cylindrical screen to adjacent a top edge of said cylindrical screen.

18. A cylindrical pellet dryer which comprises a generally cylindrical vertically disposed screen or aligned screen sections, a driven bladed rotor operating within said screen or screen sections for lifting and moving water laden particles outwardly in a circular path to impact with the screen to separate water from the particles for discharge of the water through said screen or screen sections, and at least one vertically extending elongated deflecting strip positioned on an interior surface of said screen in generally parallel relation to a rotational axis of the driven bladed rotor to interrupt a flow of particles moving along an inner surface of said screen or screen sections.

19. The centrifugal pellet dryer as defined in claim 18, wherein said at least one elongated deflecting strip is mounted on said screen interior surface by bolting to a mating mounting strip positioned in an aligned relation on an exterior surface of said screen or screen sections.

20. The centrifugal pellet dryer as defined in claim 18, wherein said at least one elongated deflecting strip has a generally angle iron shape with an elongated flange of said strip clamped between radially outwardly extending vertical side edge flanges on said screen, which are bolted together to form said cylindrical screen or screen sections.

* * * * *

US006739457C1

(12) EX PARTE REEXAMINATION CERTIFICATE (6078th)

United States Patent

Humphries, II et al.

(10) Number: US 6,739,457 C1

(45) Certificate Issued: Jan. 1, 2008

(54) DEFLECTOR FOR CENTRIFUGAL PELLET DRYER SCREEN

(75) Inventors: Toney Reid Humphries, II, Roanoke, VA (US); William Douglas Woodson, Eagle Rock, VA (US)

(73) Assignee: Gala Industries, Inc., Eagle Rock, VA (US)

Reexamination Request:
No. 90/007,441, Mar. 1, 2005

Reexamination Certificate for:

| | |
|---|---|
| Patent No.: | **6,739,457** |
| Issued: | **May 25, 2004** |
| Appl. No.: | **09/931,372** |
| Filed: | **Aug. 17, 2001** |

(51) Int. Cl.

| | |
|---|---|
| ***F26B 17/00*** | (2006.01) |
| ***F26B 5/00*** | (2006.01) |
| ***F26B 17/24*** | (2006.01) |
| ***F26B 5/08*** | (2006.01) |
| ***B01D 21/26*** | (2006.01) |

(52) U.S. Cl. .................... 210/374; 210/377; 210/512.3; 34/58; 34/59

(58) Field of Classification Search .............. 210/360.1, 210/374, 512.3, 377; 34/58, 59
See application file for complete search history.

(56) References Cited

U.S. PATENT DOCUMENTS

| | | | |
|---|---|---|---|
| 4,155,841 A | 5/1979 | Chupka et al. | 209/273 |
| 6,438,866 B1 | 8/2002 | Meydell et al. | 34/312 |

*Primary Examiner*—Sara S Clarke

(57) ABSTRACT

A deflector mounted on the internal surface of a cylindrical screen in a centrifugal pellet dryer. The deflector is one or more vertical strips mounted in spaced relation on the interior surface of the screen by bolting to mating mounting strips on the outside of the screen. The deflector strips deflect the pellets moving along the interior surface of the screen. The edge of the deflector strip facing the direction of movement of the circulating pellets is inclined to deflect the pellets back toward the rotor. In another form, the deflector strip has angled flanges with one flange clamped between outwardly extending vertical side edge flanges on the cylindrical screen. The other flange extends at an oblique angle to deflect the circulating pellets back toward the rotor.

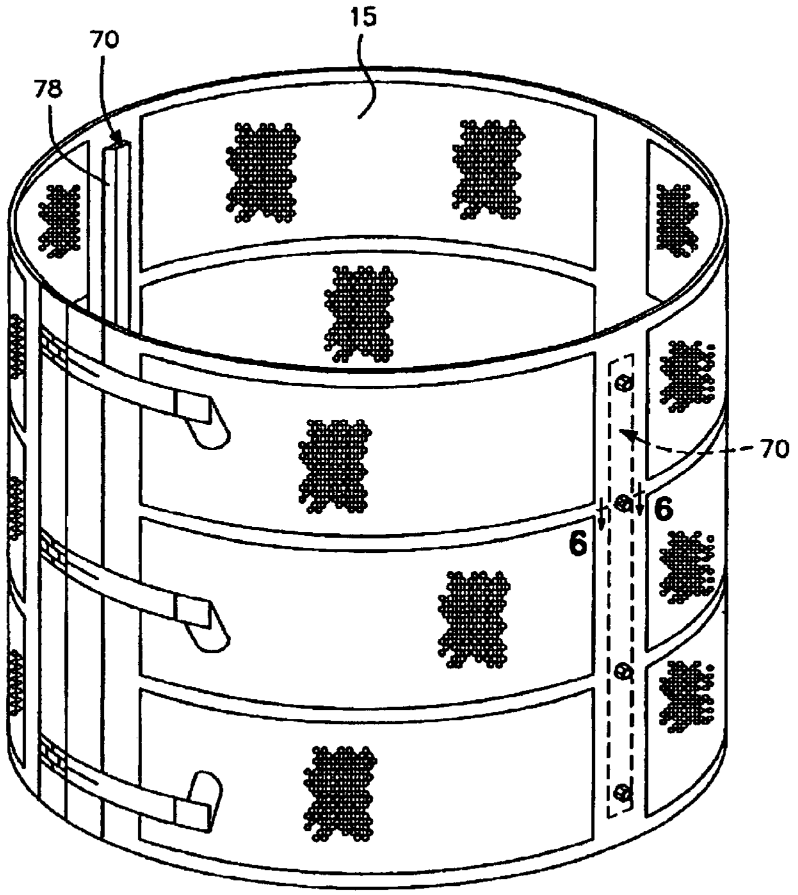

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 12–17 is confirmed.

Claims 7 and 20 are cancelled.

Claims 1 and 18 are determined to be patentable as amended.

Claims 2–6, 8–11 and 19, dependent on an amended claim, are determined to be patentable.

New claims 21–24 are added and determined to be patentable.

1. A deflector for the interior surface of a generally cylindrical vertically disposed screen in a vertical centrifugal pellet dryer, *said screen having aligned edges held together by at least one releasable connecting mechanism,* said deflector comprising at least one vertical deflecting strip supported from said screen and positioned along the interior surface of the screen in generally parallel relation to the rotational axis of a driven bladed rotor operating within the screen for lifting and moving water laden pellets outwardly in a circular path to impact with the screen to separate water from the pellets for discharge of the water through the screen, said vertical strip including an inclined surface forming a leading edge oriented in opposed relation to circular movement of the pellets along the interior surface of the screen to deflect the pellets toward the rotor, *said vertical deflecting strip being removable from said screen independent of release of said connecting mechanism.*

18. A cylindrical pellet dryer which comprises a generally cylindrical vertically disposed screen or aligned screen sections *having aligned edges held together by at least one releasable connecting mechanism*, a driven bladed rotor operating within said screen or screen sections for lifting and moving water laden particles outwardly in a circular path to impact with the screen to separate water from the particles for discharge of the water through said screen or screen sections, and at least one vertically extending elongated deflecting strip positioned on an interior surface of said screen in generally parallel relation to a rotational axis of the driven bladed rotor to interrupt a flow of particles moving along an inner surface of said screen or screen sections, *said deflecting strip being removable from said screen independent of release of said connecting mechanism.*

*21. The centrifugal pellet dryer as defined in claim 18, wherein said deflecting strip is mounted on said screen by a bolt having a countersunk head flush with an inner surface of said strip to facilitate movement of the pellets between the rotor and the strip.*

*22. The centrifugal pellet dryer as defined in claim 18, and further including at least one vertical mounting strip positioned on an outer surface of said screen and aligned with said at least one vertical deflecting strip, and fasteners extending through said screen and strips to attach said strips to said screen.*

*23. A deflector for the interior surface of a generally cylindrical vertically disposed screen in a vertical centrifugal pellet dryer, said screen having vertically aligned end edges, said deflector comprising at least one vertical deflecting strip supported from said screen and positioned along the interior surface of the screen spaced from said vertically aligned end edges and in generally parallel relation to the rotational axis of a driven bladed rotor operating within the screen for lifting and moving water laden pellets outwardly in a circular path to impact with the screen to separate water from the pellets for discharge of the water through the screen, said vertical strip including an inclined surface forming a leading edge oriented in opposed relation to circular movement of the pellets along the interior surface of the screen to deflect the pellets toward the rotor.*

*24. A cylindrical pellet dryer which comprises a generally cylindrical vertically disposed screen or aligned screen sections having vertically aligned end edges, a driven bladed rotor operating within said screen or screen sections for lifting and moving water laden particles outwardly in a circular path to impact with the screen to separate water from the particles for discharge of the water through said screen or screen sections, and at least one vertically extending elongated deflecting strip positioned on an interior surface of said screen spaced from said vertically aligned end edges and in generally parallel relation to a rotational axis of the driven bladed rotor for interrupting a flow of particles moving along an inner surface of said screen or screen sections.*

* * * * *